US008819465B2

(12) United States Patent
Mokuya et al.

(10) Patent No.: US 8,819,465 B2
(45) Date of Patent: Aug. 26, 2014

(54) INFORMATION PROCESSING DEVICE AND DATA DISTRIBUTION METHOD

(75) Inventors: Senichi Mokuya, Nagano-ken (JP); Reiji Kobayashi, Nagano-ken (JP)

(73) Assignee: Seiko Epson Corporatoin, Tokyo (JP)

( * ) Notice: Subject to any disclaimer, the term of this patent is extended or adjusted under 35 U.S.C. 154(b) by 305 days.

(21) Appl. No.: 13/248,767

(22) Filed: Sep. 29, 2011

(65) Prior Publication Data

US 2012/0117405 A1 May 10, 2012

(30) Foreign Application Priority Data

Nov. 4, 2010 (JP) .................................. 2010-247121

(51) Int. Cl.
*G06F 15/177* (2006.01)
*G06F 1/00* (2006.01)

(52) U.S. Cl.
USPC .................................... 713/323; 713/1; 713/2

(58) Field of Classification Search
USPC ......................... 710/104; 713/1–2, 323; 718/1
See application file for complete search history.

(56) References Cited

U.S. PATENT DOCUMENTS

| 6,080,207 | A | 6/2000 | Kroening et al. |
| 7,062,645 | B2 | 6/2006 | Kroening |
| 7,539,899 | B1 * | 5/2009 | Wang ............................... 714/15 |
| 2003/0208675 | A1 * | 11/2003 | Burokas et al. .................... 713/1 |
| 2004/0083355 | A1 * | 4/2004 | Smith et al. ........................ 713/1 |
| 2006/0294351 | A1 * | 12/2006 | Rostampour ...................... 713/1 |
| 2007/0124573 | A1 * | 5/2007 | Walker et al. ...................... 713/2 |
| 2008/0016200 | A1 * | 1/2008 | Fukumi .......................... 709/223 |
| 2009/0150463 | A1 * | 6/2009 | Sekiguchi et al. ............. 707/204 |
| 2010/0235828 | A1 * | 9/2010 | Nishimura et al. ............ 717/174 |
| 2013/0031341 | A1 * | 1/2013 | Ganti et al. ........................ 713/2 |

FOREIGN PATENT DOCUMENTS

| JP | 07-121395 | * | 5/1995 |
| JP | 2002-099444 | A | 4/2002 |
| JP | 2003-316578 | A | 11/2003 |
| JP | 2007-233815 | A | 9/2007 |

* cited by examiner

Primary Examiner — Thomas J Cleary

(57) ABSTRACT

An information processing device that is connected to one or more other information processing devices and distributes hibernation data to another information processing device, includes: a storage unit that stores the hibernation data; a configuration information acquisition unit that acquires identification information and configuration information describing a device configuration of each information processing device from the other information processing device; a configuration evaluation unit that analyzes the acquired configuration information and determines if the configuration of the device is the same as the configuration of the other information processing device; and a data transmission unit that, when there is at least one information processing device with the same device configuration as itself among the other information processing devices, sends the hibernation data to an information processing device with the same configuration using the identification information of that other device as the address.

20 Claims, 11 Drawing Sheets

INFORMATION PROCESSING DEVICE AND DATA DISTRIBUTION METHOD

BACKGROUND

1. Technical Field

The present invention relates to an information processing device with a hibernation function, and to a data distribution method.

2. Related Art

Japanese Unexamined Patent Appl. Pub. JP-A-2002-099444 teaches a system that uses similar technology to enable a backup computer to read and restore hibernation data created by a primary computer and thereby continue the operations handled by the primary computer when the primary computer requires maintenance or repair. The backup computer in this system has a conflict resolution function that solves conflicts resulting from device differences with the primary computer when restoring the hibernation data. More specifically, device-specific identification information (such as an IP address or Ethernet (R) address) contained in the communication data for performing operations based on the hibernation data is changed from identification information for the primary computer to identification information for the backup computer. This enables other devices that were communicating with the primary computer to continue exchanging communication data with the backup computer, and enables the backup computer to pick up and continue jobs that the primary computer was performing.

While this system accounts for differences in device-specific information between the device (primary computer) that produced the hibernation data and the device (backup computer) that receives the hibernation data, it does not consider differences in device configurations, such as differences in the installed operating system (OS) or types and versions of applications. In other words, because this system assumes that both devices have the same configuration, the hibernation data may be supplied to a device with a different configuration when the system has plural devices that receive the hibernation data, including devices with a different configuration than the device that generated the hibernation data. When this happens, the device with a different device configuration receives hibernation data that it cannot use, and the device that generated the hibernation data executes an unnecessary transmission process.

SUMMARY

An information processing device and a data distribution method according to the present invention consider differences in device configuration to appropriately distribute hibernation data.

An information processing device that is connected to one or more other information processing devices and distributes hibernation data to another information processing device, including: a storage unit that stores the hibernation data; a configuration information acquisition unit that acquires identification information and configuration information describing a device configuration of each information processing device from the other information processing device; a configuration evaluation unit that analyzes the acquired configuration information and determines if the configuration of the device is the same as the configuration of the other information processing device; and a data transmission unit that, when there is at least one information processing device with the same device configuration as itself among the other information processing devices, sends the hibernation data to an information processing device with the same configuration using the identification information of that other device as the address.

Another aspect of the invention is a data distribution method that distributes hibernation data from one information processing device to one or more other information processing devices connected to the one information processing device, including as steps executed by the one information processing device: a configuration information acquisition step that acquires identification information and configuration information describing a device configuration of each information processing device from the other information processing device; a configuration evaluation step that analyzes the acquired configuration information and determines if the configuration of the device is the same as the configuration of the other information processing device; and a data transmission step that, when in the configuration evaluation step there is at least one information processing device with the same device configuration as itself among the other information processing devices, sends the hibernation data to an information processing device with the same configuration using the identification information of that other device as the address.

An information processing device according to this aspect of the invention evaluates the device configuration of another connected information processing device and sends hibernation data only to a device with the same device configuration as itself, and can avoid sending hibernation data to other information processing devices that do not have the same device configuration as itself. In addition, if the other information processing device is configured so that it can start operating by reading the received hibernation data, another information processing device with the same device configuration can start up quickly from the same operating state.

Note that hibernation data is data storing the current operating state of an information processing device. Configuration information is preferably information related to the type of operating system or applications, or the versions thereof, that are installed to the information processing device, or information based on file system management information.

In another aspect of the invention, the configuration information acquisition unit also acquires storage information indicating if the other information processing device stores the hibernation data, is generating the hibernation data, or does not store and is not generating the hibernation data; and the data transmission unit sends hibernation data to an information processing device that does not store and is not generating the hibernation data in the group of information processing devices with the same configuration.

This configuration can prevent duplicatively sending hibernation data to an information processing device of the same device configuration that already has the hibernation data.

Further preferably in another aspect of the invention, the data transmission unit sends data not including some information including device-specific information as the hibernation data.

An information processing device that received hibernation data in this aspect of the invention can apply the hibernation data to itself by embedding stored information specific to itself in the received hibernation data. Conflicts caused by device differences in hibernation data distribution can therefore be eliminated. Note that "some information including device-specific information" includes to the MAC address, IP address, or computer name of the information processing device, the user name, and time information.

Preferably in another aspect of the invention, the information processing device to which the hibernation data is sent by the data transmission unit has the storage unit, the configuration information acquisition unit, the configuration evaluation unit, and the data transmission unit, and sends the hibernation data to another information processing device to which it is connected.

When the information processing device that receives the hibernation data is connected to another information processing device through a different network, this aspect of the invention enables appropriately sending hibernation data to another information processing device on a different network.

An information processing device that is connected to one or more other information processing devices and distributes hibernation data to another information processing device, including: a data storage evaluation unit that determines if the device stores the hibernation data; a configuration information request unit that, when the information processing device does not store the hibernation data, requests from another information processing device storage information indicating if configuration information describing the device configuration of each information processing device, identification information, and hibernation data is stored, the hibernation data is being generated, or the hibernation data is not stored and is not being generated; a configuration information acquisition unit that acquires the configuration information, identification information, and storage information; a configuration evaluation unit that analyzes the acquired configuration information and determines if the configuration of the other information processing device matches its own device configuration; a data request unit that, when there is at least one information processing device with the same device configuration in the group of other information processing devices, requests the hibernation data from an information processing device that stores or is generating the hibernation data from among the group of information processing devices with the same device configuration using the identification information of that information processing device as the address; and a data acquisition unit that acquires the hibernation data.

This aspect of the invention enables even an information processing device that does not store hibernation data to get hibernation data that it can apply to itself. In addition, because each information processing device is configured to automatically find an information processing device that has the hibernation data and acquire the hibernation data therefrom, hibernation data can be automatically distributed to devices with the same configuration by storing the hibernation data in a desired information processing device.

An information processing device according to another aspect of the invention preferably also has a startup unit that starts the information processing device in conjunction with acquisition of hibernation data by the data acquisition unit.

This aspect of the invention enables even a device that does not store the hibernation data to acquire hibernation data that can be applied to itself and start up quickly. Note that the information processing device preferably overwrites part of the information including device-specific information contained in the acquired hibernation data to information applicable to itself, and then applies the hibernation data to itself.

An information processing device according to another aspect of the invention preferably also has a data generating unit that generates hibernation data for the information processing device when the other information processing devices do not include an information processing device that has the same device configuration and stores the hibernation data, or has the same device configuration and is generating the hibernation data.

This aspect of the invention enables a device that does not store hibernation data to generate hibernation data and start up quickly even when hibernation data cannot be acquired from another device.

Further preferably, the configuration information is a hash value that is computed from text information including at least one of file system management information and information related to the type of software installed on the other information processing device.

By comparing hash values for itself and another information processing device, this aspect of the invention enables easily determining if the device configurations match.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of an information processing device and data distribution method according to the invention are described below with reference to the accompanying figures.

An information processing device according to the invention has a hibernation function. A hibernation function is a function that stores the intermediate state of a task performed by the information processing device at any given point in time to a nonvolatile storage device, reads the stored data and restores the same intermediate state, and then starts the same task from the same intermediate state. The data used to restore this intermediate state of a particular task is called hibernation data. Device startup is therefore very fast because the information processing device can start operations that are already in progress by reading this hibernation data.

An information processing device according to the invention receives the hibernation data from another information processing device connected to a common network. More specifically, the hibernation data stored by one information processing device is used by a plurality of devices. Storing hibernation data on each information processing device is therefore not necessary. An information processing device according to the invention also has a function that evaluates the device configuration of the device receiving the hibernation data so that the hibernation data is received only by devices that can use the hibernation data.

Embodiment 1

Figure 1:
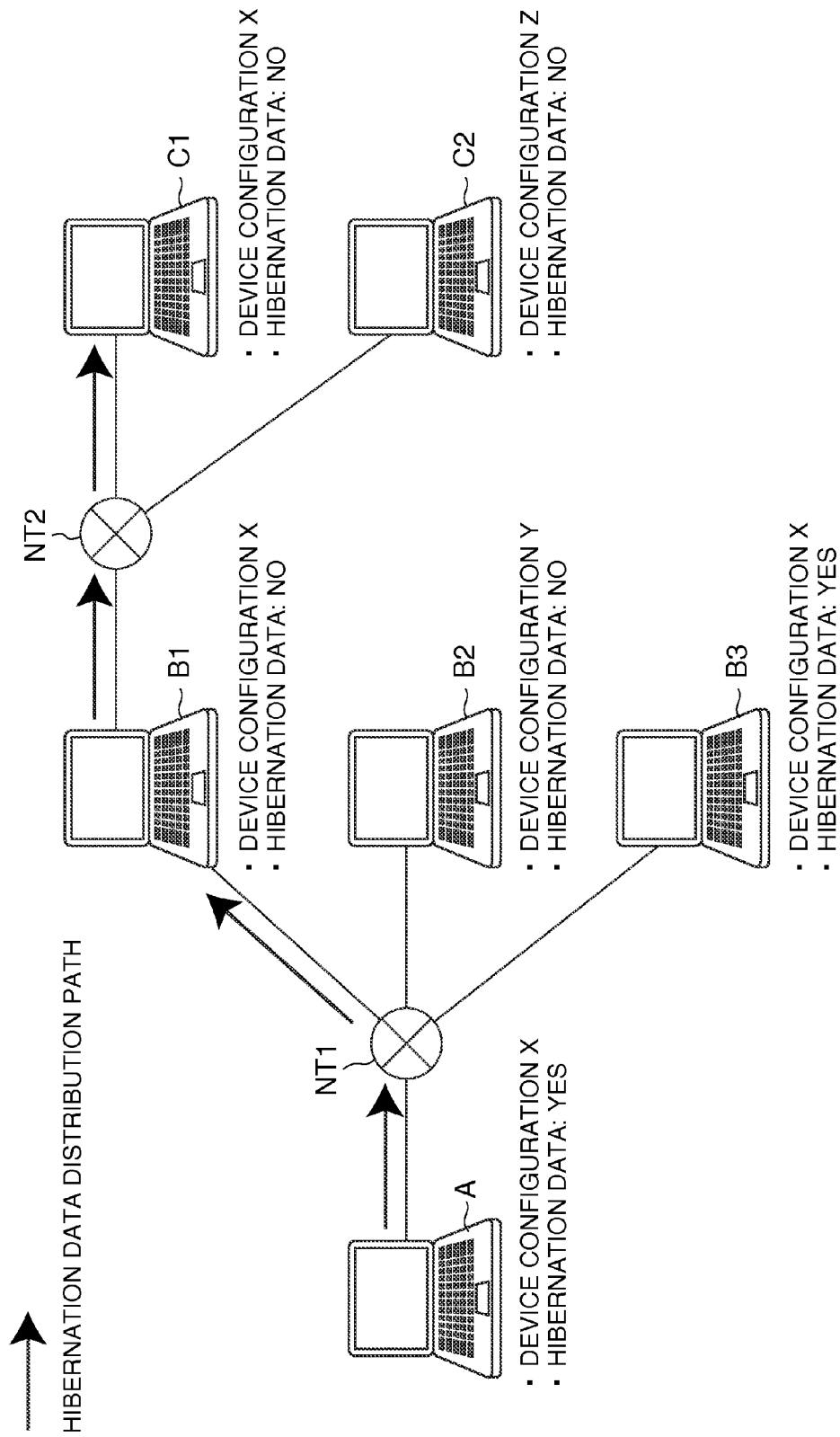
FIG. 1 describes the connections and reception of data by information processing devices according to a first embodiment of the invention.

FIG. 1 shows the connections between information processing devices according to this embodiment of the invention.

Device A, which is an information processing device (such as a computer), is connected to devices B1, B2, B3, which are also information processing devices, over a network NT1 such as a LAN or the Internet. Device B1 is also connected to devices C1, C2, which are also information processing devices, over another network NT2. Device A functions as a host device for network NT1, and distributes hibernation data to devices B1, B2, B3.

Device B1 functions as a host device for network NT2, and distributes hibernation data acquired from device A to devices C1, C2. As shown in the figure, device A distributes hibernation data to device B1, which is one of the connected devices B1, B2, B3 that has the same device configuration as itself and does not store any hibernation data. Device B1 likewise distributes hibernation data to device C1, which is one of the connected devices C1, C2 that has the same device configuration as itself and does not store any hibernation data.

This hibernation data distribution process is described below.

Devices A, B, C may be any type of device that has an information processing capability (such as a CPU) and is used connected to a plurality of other devices over a network. Examples of such devices other than computers include POS terminals, projectors, and hybrid printers.

Figure 2:
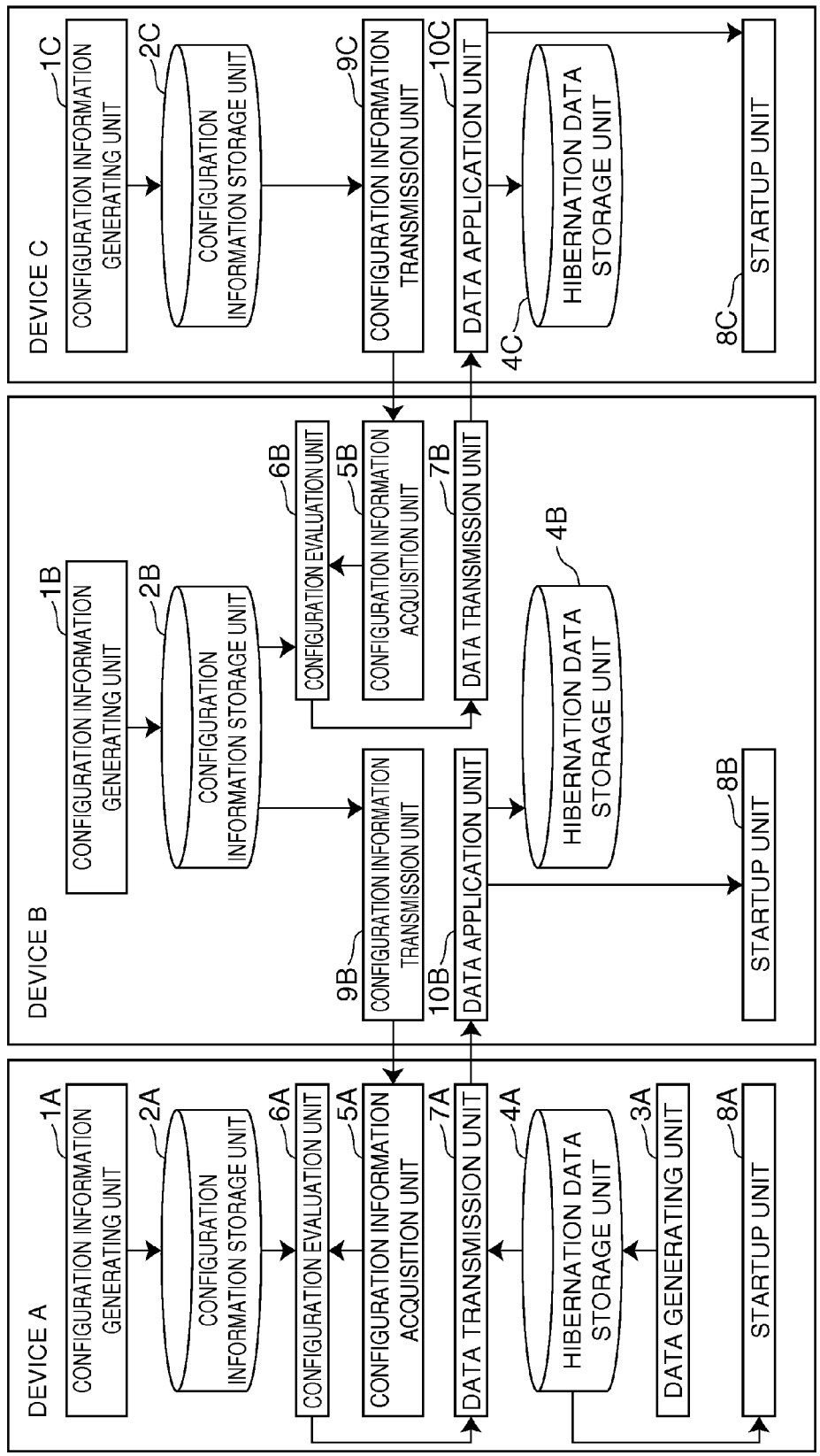
FIG. 2 is a block diagram showing the functional configuration of an information processing device according to the first embodiment of the invention.

FIG. 2 is a block diagram showing the functional configuration of devices A, B, C. Device A includes a configuration information generating unit 1A that generates configuration information about itself (that is, device A), a configuration information storage unit 2A that stores the generated configuration information, a data generating unit 3A that generates hibernation data, a hibernation data storage unit 4A that stores the generated hibernation data, a configuration information acquisition unit 5A that acquires configuration information from device B, a configuration evaluation unit 6A that determines from the configuration information if its own configuration (the configuration of device A in this case) is the same as the configuration of a different device B, a data transmission unit 7A that sends hibernation data to a device B with the same configuration, and a startup unit 8A that uses the hibernation data for device startup (to boot device A in this case).

The configuration information in this embodiment of the invention is described next with reference to FIG. 3. The configuration information in this embodiment of the invention is a hash value calculated from text information representing the device configuration. A hash value is a value with a specif is number of digits that is calculated from text information, which is the data for which the hash value is calculated, using a hash function. If the hash function is MD5, for example, a 128-bit hash value is computed.

Figure 3:
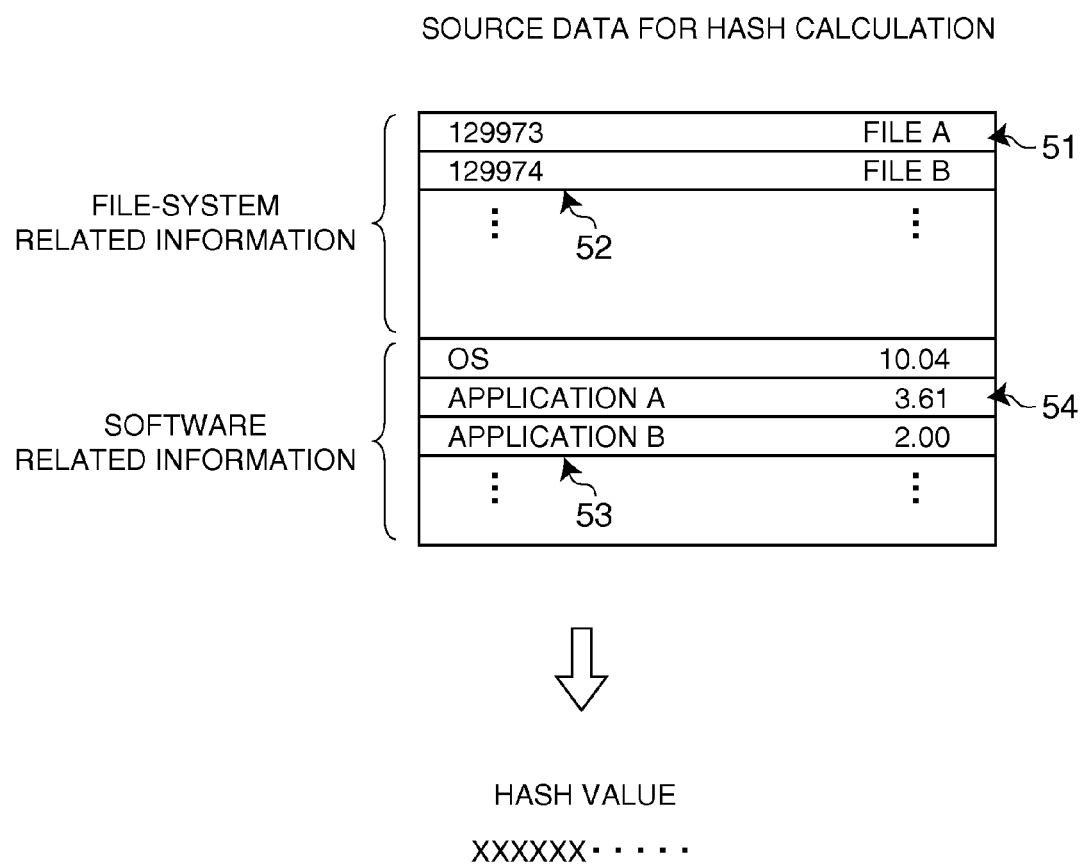
FIG. 3 describes the structure of configuration information.

FIG. 3 is an example of the source data of the hash value in this embodiment of the invention. The source data contains file-system-related information and software-related information as text information. As shown in the figure, the file-system-related information includes an object name 51 (such as a file or directory) in the file system of the device, and storage information 52 indicating the storage location of the object.

The software-related information includes software name 53 and software version information 54 about the operating system and applications installed on the device.

The storage information 52 denotes, for example, the storage address of the particular object on the hard disk drive of the device, and the storage information 52 and object name 51 are extracted from inode information containing file system management information. If the source data is the same, the calculated hash value will also be the same, and in this embodiment of the invention if the hash values of plural devices are the same, the text information denoting the device configuration of the plural devices will also be the same. More specifically, if the hash values of plural devices are the same, the configuration of the hard disk drive, operating system, and applications is also the same in the plural devices.

Referring again to FIG. 2, the configuration information generating unit 1A calculates a hash value from the text information (source data) as the configuration information. Note that this configuration information may be generated regularly, such as when an installed application is upgraded, or extemporaneously whenever the device configuration changes.

The configuration information storage unit 2A rewritably and non-volatilely stores the most recent configuration information generated by the configuration information generating unit 1A.

The data generating unit 3A generates hibernation data for reproducing a specific operating state of device A. Note that this specific operating state is the operating state when the user starts an operation using the device after devices A, B, C start up. Examples of the specific operating state include states in which the login screen is displayed, and states in which an application that is normally used has already been started. This specific state is preferably a configuration that can be set by the user using a function or operating method of device A, B, or C.

The hibernation data storage unit 4A rewritably and non-volatilely stores the hibernation data generated by the data generating unit 3A.

The configuration information acquisition unit 5A acquires configuration information describing the device configuration of device B from device B. In addition to the device configuration, the configuration information acquisition unit 5A also acquires an IP address (identification information) identifying device B and the hibernation data storage information from device B. This storage information is information indicating whether or not the device stores the most recent hibernation data. If the stored hibernation data is not optimal for the configuration of the device, the device is handled as not storing the optimal hibernation data. The hibernation data may not be suited to itself when the device configuration has changed and the hibernation data does not match the device configuration, such as when an application installed to the device has been upgraded.

The configuration evaluation unit 6A determines if the device configuration of device B matches the device configuration of device A based on the configuration information generated by configuration information generating unit 1A and the configuration information acquired from device B.

More specifically, the configuration evaluation unit 6A compares the hash values of device A and device B, determines the device configurations match if the hash values are the same, and determines the device configurations are not the same if the hash values do not match. The configuration evaluation unit 6A also analyzes storage information acquired with the configuration information, and determines if hibernation data is stored on device B.

The data transmission unit 7A sends the hibernation data stored in hibernation data storage unit 4A to the device B that is determined by the configuration evaluation unit 6A to have the same device configuration but does not store the optimal hibernation data. More specifically, the data transmission unit 7A sends the hibernation data to the IP address of a device B determined to have the same device configuration. Note that the data transmission unit 7A sends the hibernation data stored in the hibernation data storage unit 4A except for the device-specific information (such as the MAC address, IP address, computer name, and user name) and time information. As a result, the device B that acquires the hibernation data can resolve conflicts resulting from device differences with device A and can apply the hibernation data to itself (described below).

The startup unit 8A restores the hibernation data stored in the hibernation data storage unit 4A and enables the device to quickly resume operation from the specific operating state. More specifically, if the specific state is the state in which the login screen is displayed, device A skips the normal startup process and starts operation from the state displaying the login screen.

The functional configuration of device B is described next. Note that devices B1, B2, B3 all have the same configuration. As shown in FIG. 2, device B has a configuration information generating unit 1B that generates configuration information about itself (that is, device B), a configuration information storage unit 2B that stores the generated configuration information, a configuration information transmission unit 9B that sends configuration information to device A, a data application unit 10B that applies the hibernation data acquired from device A to itself (that is, device B), a hibernation data storage unit 4B that stores the acquired hibernation data, and a startup unit 8B that reads the acquired hibernation data and boots itself (that is, device B). The device B also has a configuration information acquisition unit 5B that acquires configuration information from device C, a configuration evaluation unit 6B that determines from the configuration information if the configuration of device B is the same as the configuration of device C, and a data transmission unit 7B that sends hibernation data to a device C with the same device configuration.

The configuration information generating unit 1B calculates a hash value from text information describing the device configuration of device B as the configuration information. The configuration information storage unit 2B rewritably, nonvolatilely stores the generated configuration information. The configuration information generating unit 1B and configuration information storage unit 2B have the same configuration as the configuration information generating unit 1A and configuration information storage unit 2A of device A.

The configuration information transmission unit 9B sends configuration information describing the device configuration of device B generated by the configuration information generating unit 1B to device A. More specifically, the configuration information transmission unit 9B broadcasts the configuration information for device A to all connected devices B, and device B sends its own configuration information to device A triggered by receiving configuration information from device A.

The data application unit 10B applies the hibernation data to itself (device B) by embedding device-specific information for device B (such as the MAC address, IP address, computer name, or user name) and time information in the hibernation data acquired from device A. This enables device B to startup quickly using the acquired hibernation data as its own hibernation data.

The hibernation data storage unit 4B rewritably and non-volatilely stores the hibernation data acquired from device A and adapted by the data application unit 10B to device B.

The startup unit 8B restores the hibernation data adapted to device B by the data application unit 10B, and starts the device (device B) from the specific operating state (such as a state displaying the login screen). More specifically, similarly to startup unit 8A in device A, the startup unit 8B skips the normal startup process and starts device B operation from the specific operating state.

The configuration information acquisition unit 5B acquires stored information including the configuration information, IP address, and hibernation data from device C. The configuration evaluation unit 6B compares the hash value of device B with the hash value of device C, determines if the configurations of device B and device C are the same, and determines if device C stores optimal hibernation data. More specifically, configuration information acquisition unit 5B and configuration evaluation unit 6B have the same configuration as the configuration information acquisition unit 5A and configuration evaluation unit 6A of device A.

The functional configuration of device C is described next. Note that devices C1, C2 have the same configuration. Device C has a configuration information generating unit 1C that generates configuration information for itself (that is, device C), a configuration information storage unit 2C that stores the generated configuration information, a configuration information transmission unit 9C that sends the configuration information to device B, a data application unit 10C that applies hibernation data acquired from device B to itself (device C), a hibernation data storage unit 4C that stores the acquired, hibernation data, and a startup unit 8C that reads the acquired hibernation data and starts device C. Note that these parts have the same configuration as the parts of the same names in device A and device B.

In this embodiment of the invention devices A, B, and C may all have the same configuration, that is, the same configuration as device B described above. In this case, device A can be configured with a data generating unit that generates hibernation data added to the above-described configuration of device B, or hibernation data generated by an external device can be stored in advance to the hibernation data storage unit.

Figure 4:
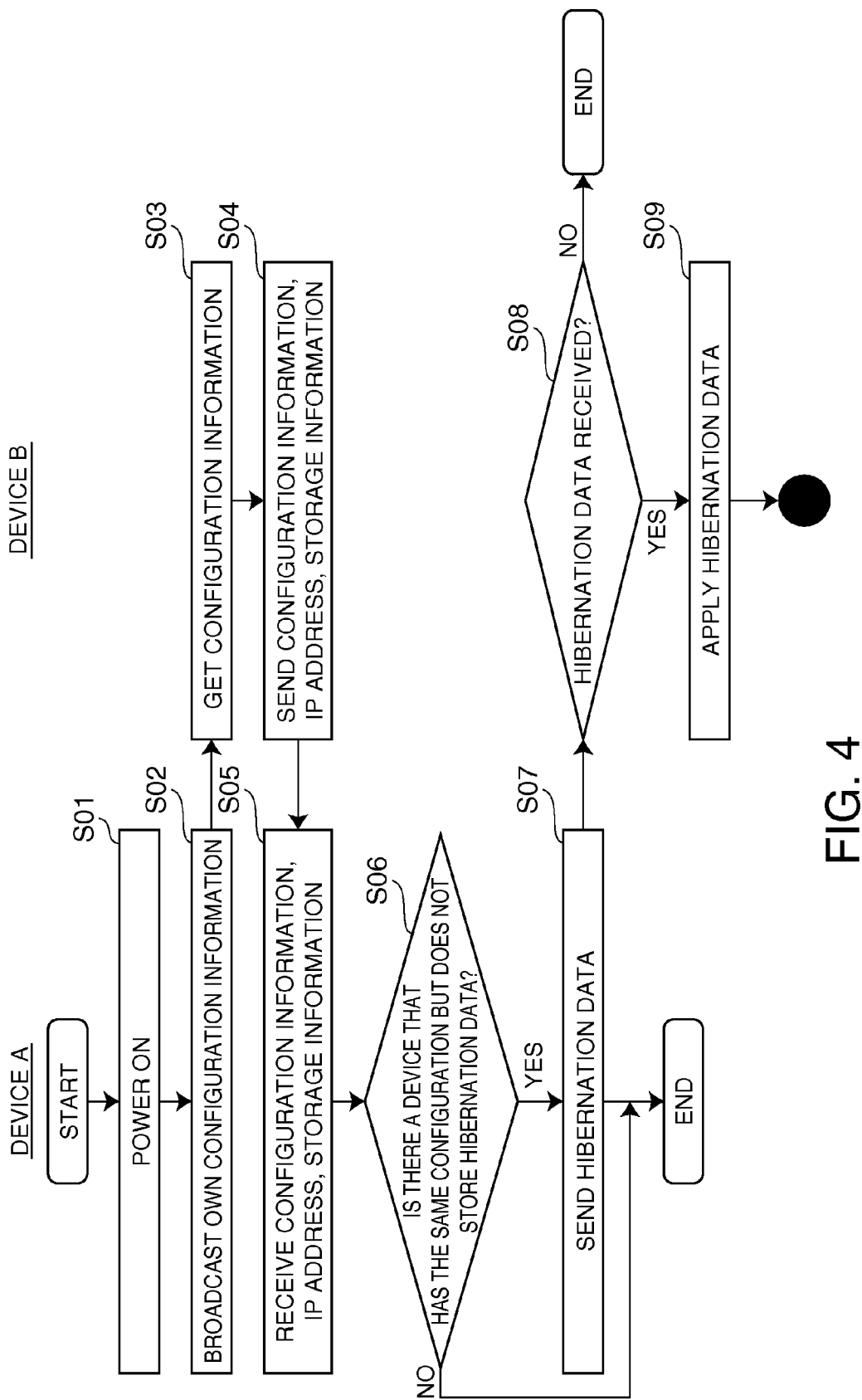
FIG. 4 is a flow chart of the data distribution process in the first embodiment of the invention.

The hibernation data distribution method of the invention is described next with reference to FIG. 4 and FIG. 5. FIG. 4 is a flow chart showing the distribution process whereby device A distributes hibernation data to device B.

Triggered by the power turning ON (S01), device A broadcasts its own configuration information to connected devices B1, B2, B3 (S02).

When device B receives configuration information from device A (S03), it returns its own configuration information, IP address, and hibernation data storage information to device A (S04). When device A acquires configuration information, IP address, and storage information from connected devices B1, B2, B3 (S05), device A determines from the acquired configuration information and storage information if there is a device B that has the same configuration but does not store optimal hibernation data (S06).

If step S06 determines there is such a device B (S06 returns Yes), device A sends its own hibernation data to that device B (S07).

When the device B receives the hibernation data (S08 returns Yes), it adapts the hibernation data to itself (S09). The device B then recreates the acquired hibernation data and starts operation from the specific operating state. If hibernation data is not acquired (S08 returns No), device B starts up through the normal startup process, or starts up using the stored hibernation data.

If step S06 determines there is not such a device B (S06 returns No), device A ends the process without transmitting its own hibernation data. Device A also starts up quickly using the stored hibernation data.

Figure 5:
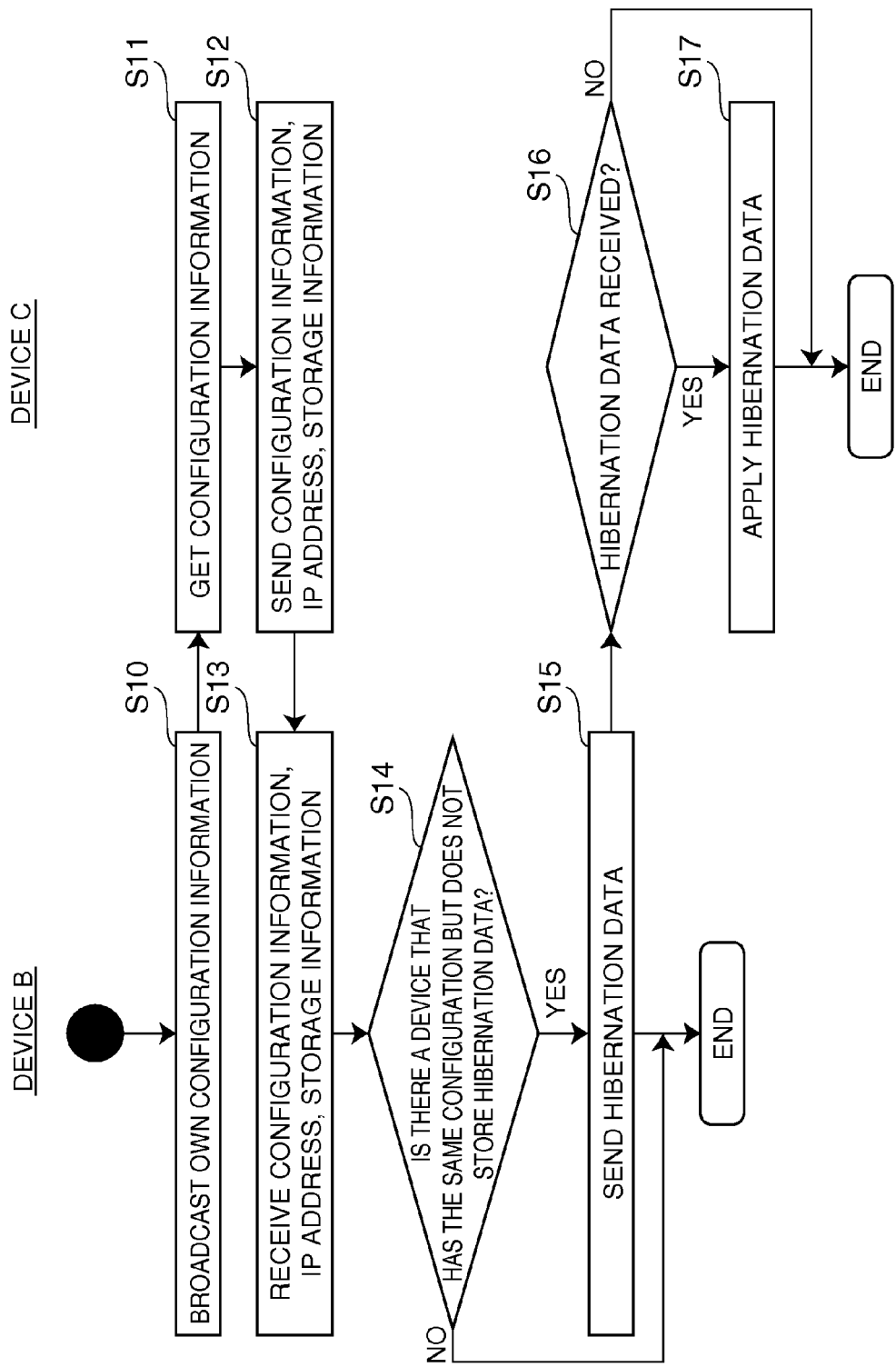
FIG. 5 is a flow chart of the data distribution process in the first embodiment of the invention.

FIG. 5 is a flowchart of a distribution process whereby a device B that acquired hibernation data distributes hibernation data to device C.

Device B broadcasts its own configuration information to connected devices C1, C2 (S10).

When device C receives configuration information from device B (S11), it returns its own configuration information, IP address, and hibernation data storage information to device B (S12). When device B acquires configuration information, IP address, and storage information from connected devices C1, C2 (S13), device B determines from the acquired configuration information and storage information if there is a device C that has the same configuration but does not store optimal hibernation data (S14).

If step S14 determines there is such a device C (S14 returns Yes), device B sends its own hibernation data to that device C (S15).

When the device C receives the hibernation data (S16 returns Yes), it adapts the hibernation data to itself (S17). The device C then recreates the acquired hibernation data and starts operation from the specific operating state. If hibernation data is not acquired (S16 returns No), device C starts up through the normal startup process, or starts up using the stored hibernation data.

If step S14 determines there is not such a device C (S14 returns No), device B ends the process without transmitting hibernation data. More specifically, if device B acquires hibernation data from device A, device B sends hibernation data to device C using the same processing method as device A.

With this first embodiment of the invention, device A storing hibernation data is configured to unconditionally transmit hibernation data, and can therefore distribute hibernation data enabling a rapid start from a desired operating state to device B (devices B1 to B3) if hibernation data describing a desired operating state is generated by or stored in device A.

Other embodiments of the invention are described below with reference to FIG. 6 to FIG. 11. Note that like parts in the foregoing first embodiment and the following embodiments of the invention are identified by like reference numerals and further detailed description thereof is omitted.

Embodiment 2

Figure 6:
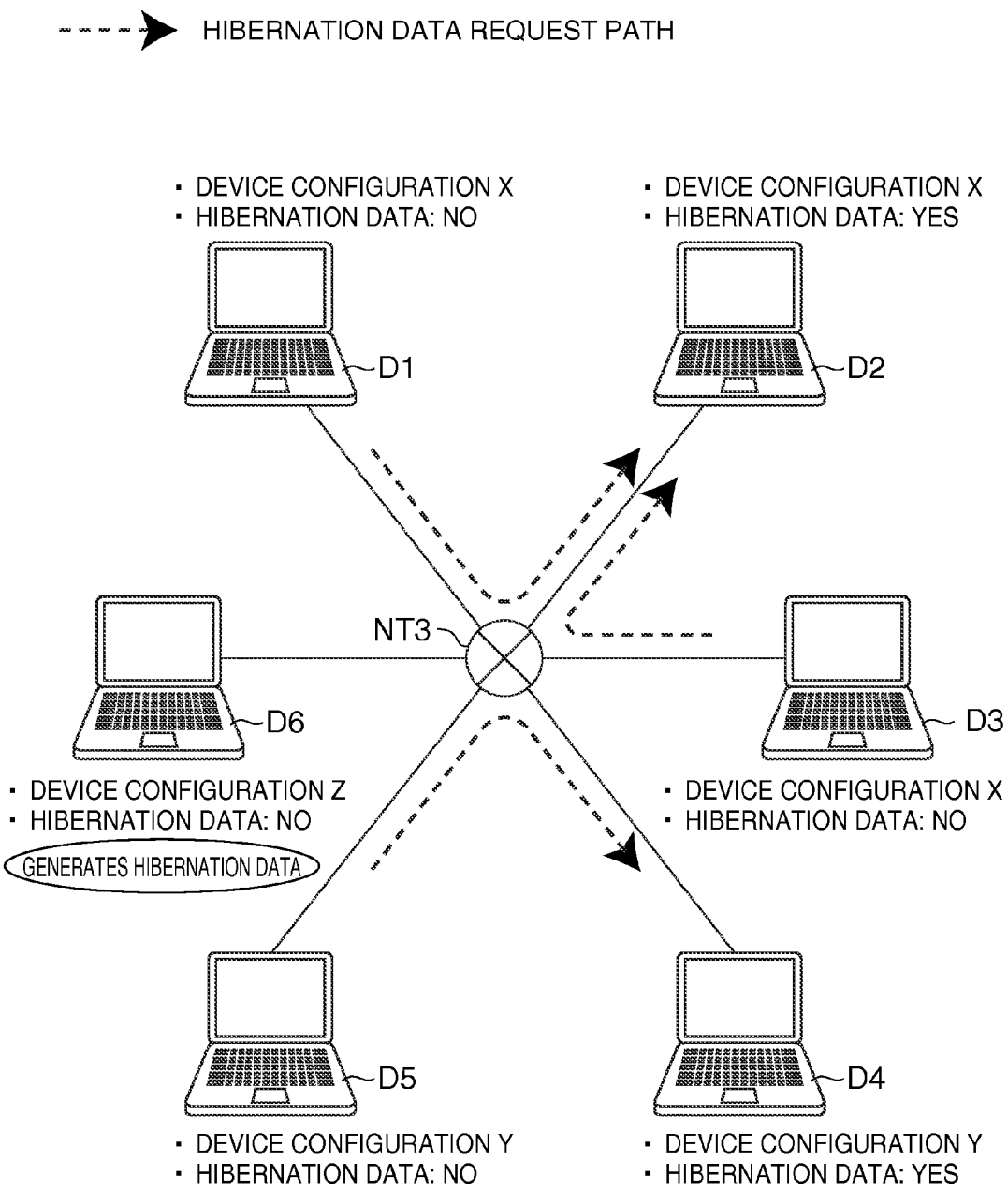
FIG. 6 describes the connections and reception of data by information processing devices according to a second embodiment of the invention.

A second embodiment of the invention is described next with reference to FIG. 6 to FIG. 8. FIG. 6 shows the connection of information processing devices in this embodiment of the invention. Devices D1, D2, . . . D6, which are information processing devices, are connected through a network NT3. In this embodiment of the invention, each of the devices D1, D2, . . . D6 has the same configuration, determines if it stores optimal hibernation data, and requests hibernation data from another device D if it does not have the optimal hibernation data. As shown in the figure, device D1 and device D3 have the same device configuration X, and request hibernation data from device D2, which stores optimal hibernation data. Device D5 similarly requests hibernation data from device D4, which stores the optimal hibernation data and has the same device configuration Y as device D5. Device D6 generates its own hibernation data because there is not another device with the same device configuration.

Figure 7:
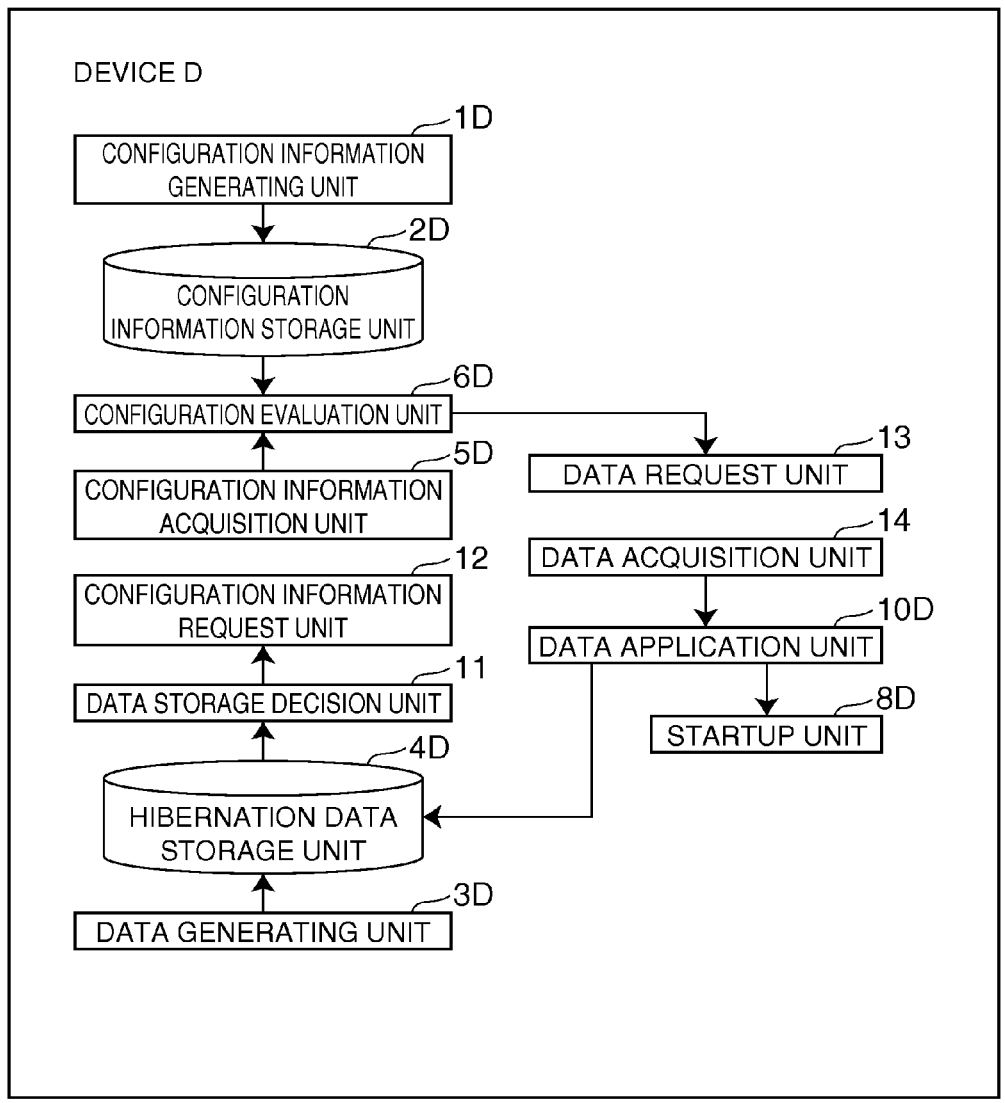
FIG. 7 is a block diagram showing the configuration of an information processing device according to the second embodiment of the invention.

FIG. 7 is a block diagram showing the functional configuration of device D, which is an information processing device according to the invention. Note that devices D1, D2, . . . D6 all have the same configuration. A device D has a configuration information generating unit 1D, configuration information storage unit 2D, data generating unit 3D, hibernation data storage unit 4D, data storage decision unit 11, configuration information request unit 12, configuration information acquisition unit 5D, configuration evaluation unit 6D, data request unit 13, data acquisition unit 14, data application unit 10D, and startup unit 8D. The parts of this configuration that are characteristic of device D are described below.

The data storage decision unit 11 determines if the device (device D) stores optimal hibernation data. More specifically, if the stored hibernation data is not optimal for the actual configuration of the device, the data storage decision unit 11 determines that optimal hibernation data is not stored.

If the data storage decision unit 11 determines that optimal hibernation data is not stored by that device D, the configuration information request unit 12 requests configuration information for the device from another connected device D. More specifically, the configuration information request unit 12 sends a configuration information request signal that requests the configuration information, IP address, and hibernation data. Because each device D in this embodiment of the invention has a data generating unit 3D that generates hibernation data, the storage information indicates if a device D stores optimal hibernation data, is generating optimal hibernation data, or does not have and is not generating optimal hibernation data.

The configuration evaluation unit $6d$ determines if the device configuration is the same as the device configuration of the other device D that received the configuration information, and if the other device D has the optimal hibernation data. More specifically, the configuration evaluation unit $6d$ analyzes the storage information and determines that the other device D has the optimal hibernation data if the other device D stores optimal hibernation data or if the other device D is generating optimal hibernation data, and determines that the other device D does not have the optimal hibernation data if it does not store and is not generating optimal hibernation data.

If the configuration evaluation unit $6d$ determines that the other device D has the same device configuration and has the optimal hibernation data, the data request unit 13 requests the hibernation data. The data acquisition unit 14 then gets the hibernation data from the device D to which the request is sent.

Figure 8:
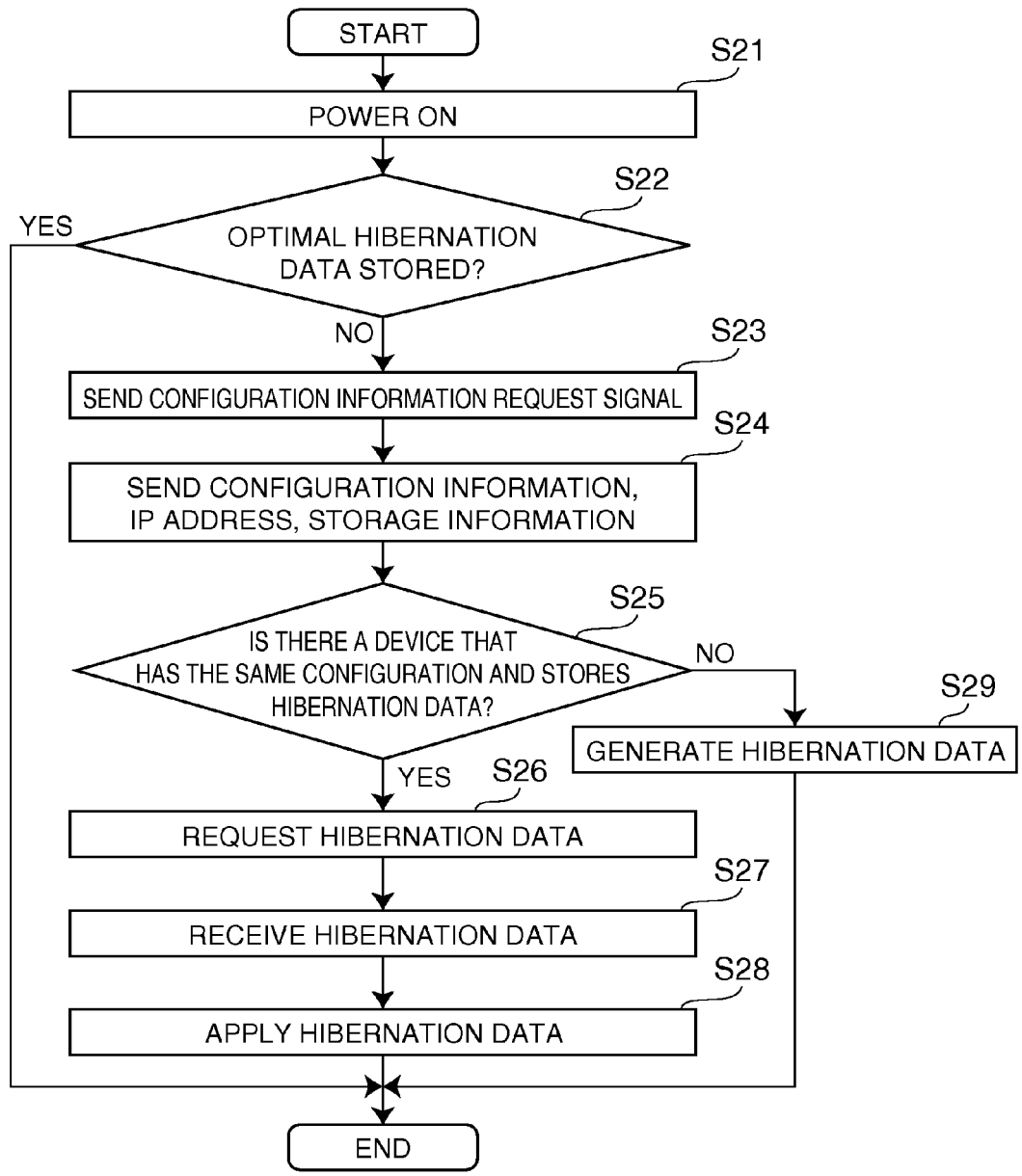
FIG. 8 is a flow chart of the data distribution process in the second embodiment of the invention.

FIG. 8 is a flow chart of the hibernation data distribution process in this embodiment of the invention.

When the power turns on (S21), device D determines if hibernation data optimal to the device configuration is stored (S22). If the optimal hibernation data is not stored (S22 returns No), the device D sends a device configuration request signal to another connected device D (S23). The device configuration, IP address, and hibernation data storage information is then received from the other device D (S24). The received information is then analyzed to determine if among the other devices D connected to the network there is another device D that has the same device configuration and stores the optimal hibernation data (S25). If there is such a device D (S25 returns Yes), hibernation data is requested from that device D (S26). The hibernation data is then acquired from the device D (S27), device-specific information is embedded, and the hibernation data is applied (S28). The acquired hibernation data is then restored and the device starts up.

However, if another device D that has the same device configuration and stores the optimal hibernation data is not found (S25 returns No), the device creates its own hibernation data (S29). The generated hibernation data is then restored and the device starts up.

If the device already stores the optimal hibernation data (S22 returns Yes), device D restores the stored hibernation data and starts up.

In this embodiment of the invention device D also has a configuration information transmission unit and a data transmission unit (both not shown in the figures). If configuration information is requested from another device D, device D sends its own configuration information, IP address, and hibernation data storage information to the other device D. When hibernation data is requested from a device D other than itself, the device D sends the stored hibernation data to the other device D.

If the device D that acquires the hibernation data is connected to a network other than network NT3, hibernation data can be distributed to another device connected to device D through the other network by means of the data distribution method described in the first embodiment of the invention.

In a group of devices D1, D2, . . . D6 that all have the same device configuration in this second embodiment of the invention, a device D that does not have the optimal hibernation data requests and acquires the hibernation data from a device D other than itself, and a device D that cannot acquire hibernation data from another device generates the hibernation data itself. As a result, if hibernation data describing the user's preferred operating environment is stored in advance to a desired device D, the hibernation data can be automatically distributed to the devices D1, D2, . . . D6.

Embodiment 3

Figure 9:
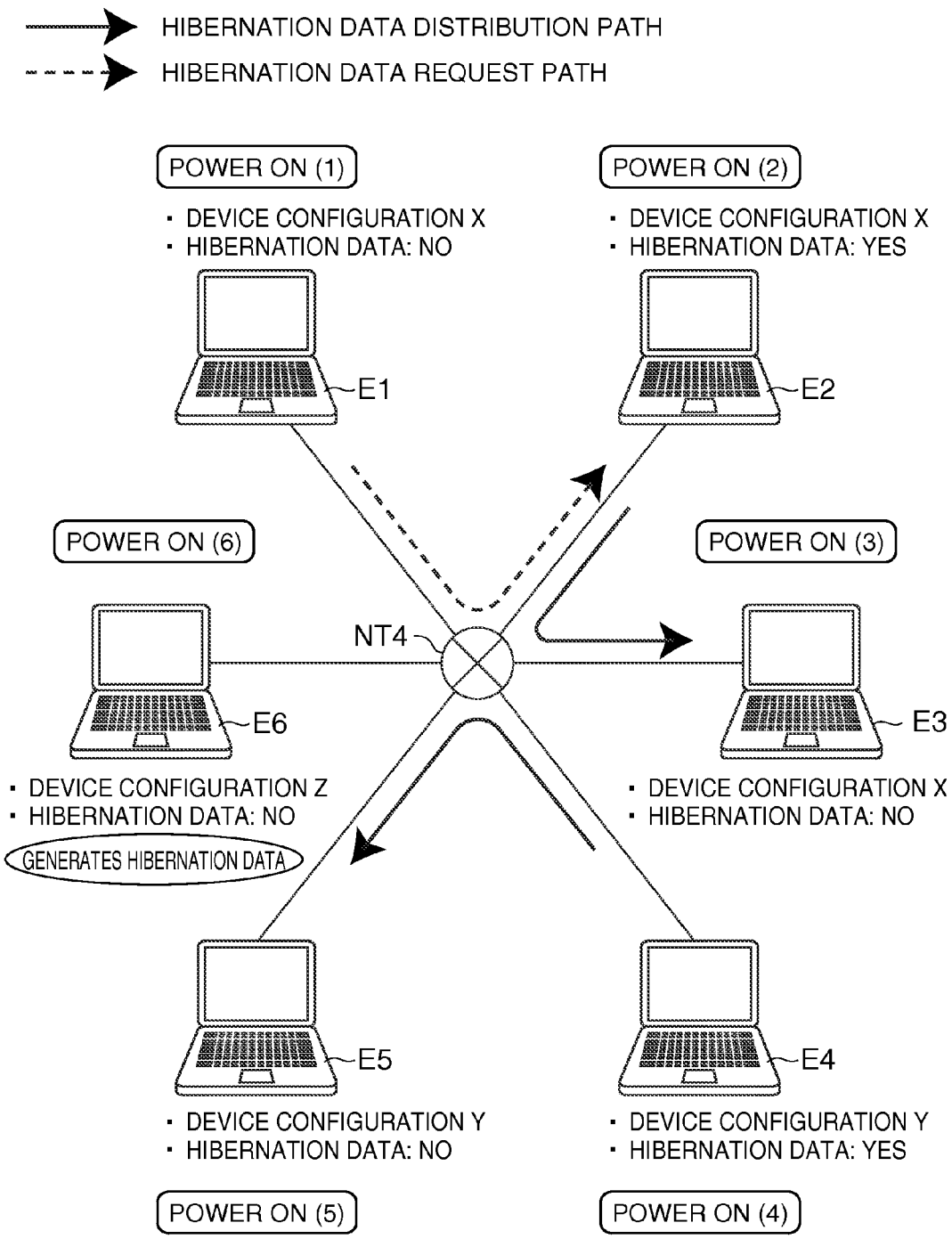
FIG. 9 describes the connections and reception of data by information processing devices according to a third embodiment of the invention.

A third embodiment of the invention is described next with reference to FIG. 9 to FIG. 11. Devices E1, E2, . . . E6 have the same configuration as devices D in the second embodiment of the invention. FIG. 9 shows the connections of the information processing devices in this embodiment of the invention. Devices E1, E2, . . . E6, which are information processing devices, are connected through a network NT4. A feature of this embodiment of the invention is that each device E determines if it has the optimal hibernation data, sends the hibernation data to another device E if it has the optimal hibernation data, and requests hibernation data from another device E if it does not have the hibernation data.

As shown in FIG. 9, if device power is turned on in the order device E1, device E2, . . . device E6, device E1 which does not store hibernation data requests hibernation data from device E2, which has the same device configuration X as device E1 and has the optimal hibernation data. Device E2, which has hibernation data, sends hibernation data to device E3, which has the same device configuration X and does not have the hibernation data (this also applies to device E4). Device E3, which does not have the hibernation data, does not request hibernation data because hibernation data is sent from device E2 before the hibernation data can be requested.

Device E6 does not have the same configuration as any other connected device, and therefore generates its own hibernation data.

Figure 10:
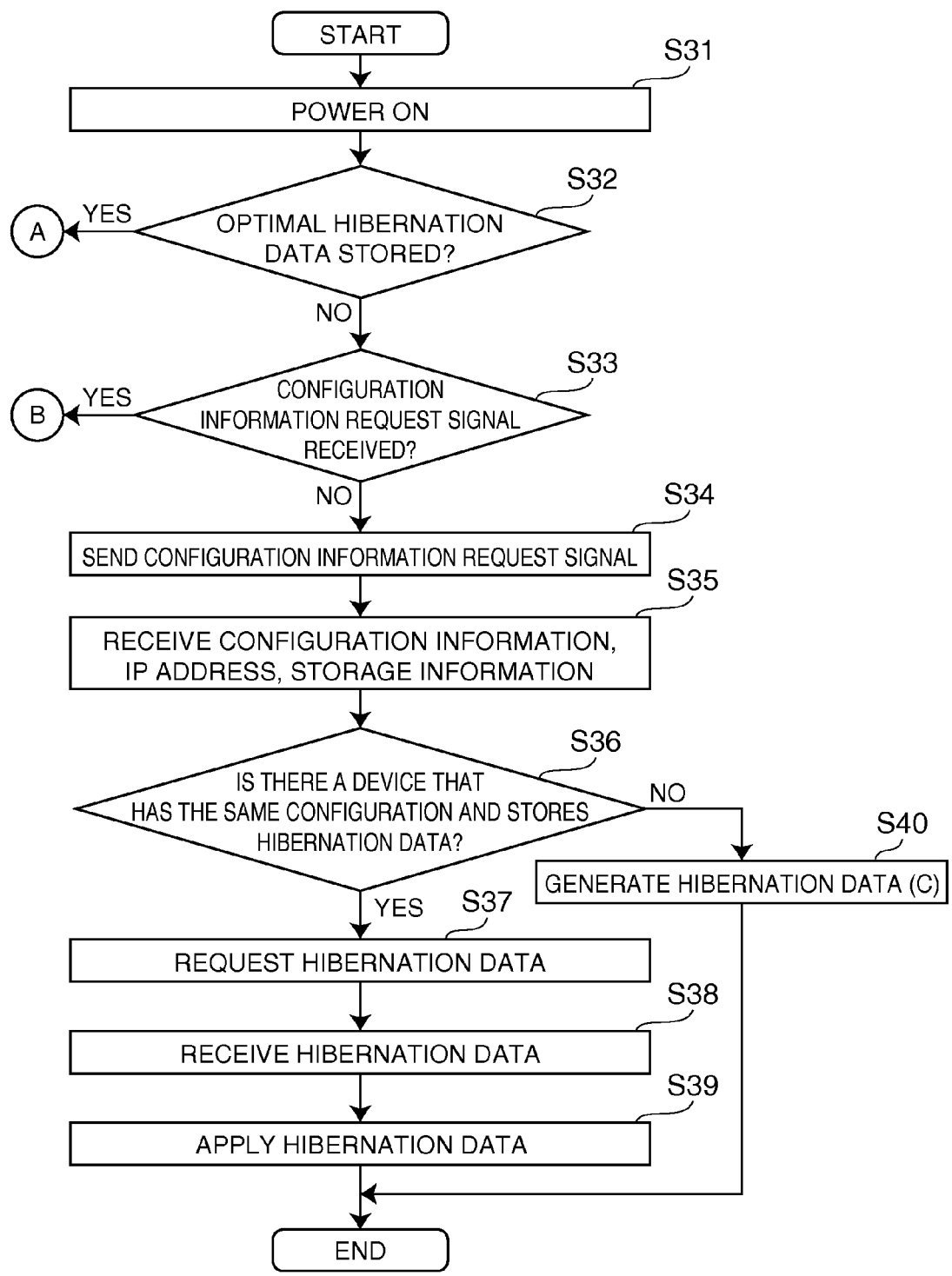
FIG. 10 is a flow chart of the data distribution process in the third embodiment of the invention.

FIG. 10 is a flow chart of the hibernation data distribution process according to this embodiment of the invention.

When the power turns on (S31), the device E determines if hibernation data optimal to its own configuration is stored (S32). If the optimal hibernation data is not stored (S32 returns No) and a device configuration request signal is not received from another device E (S33 returns No), steps S34 to S40 execute, and the hibernation data is requested and received, or is generated. Steps S34 to S40 are the same as step S23 to S29 in the second embodiment (see FIG. 8).

Figure 11:
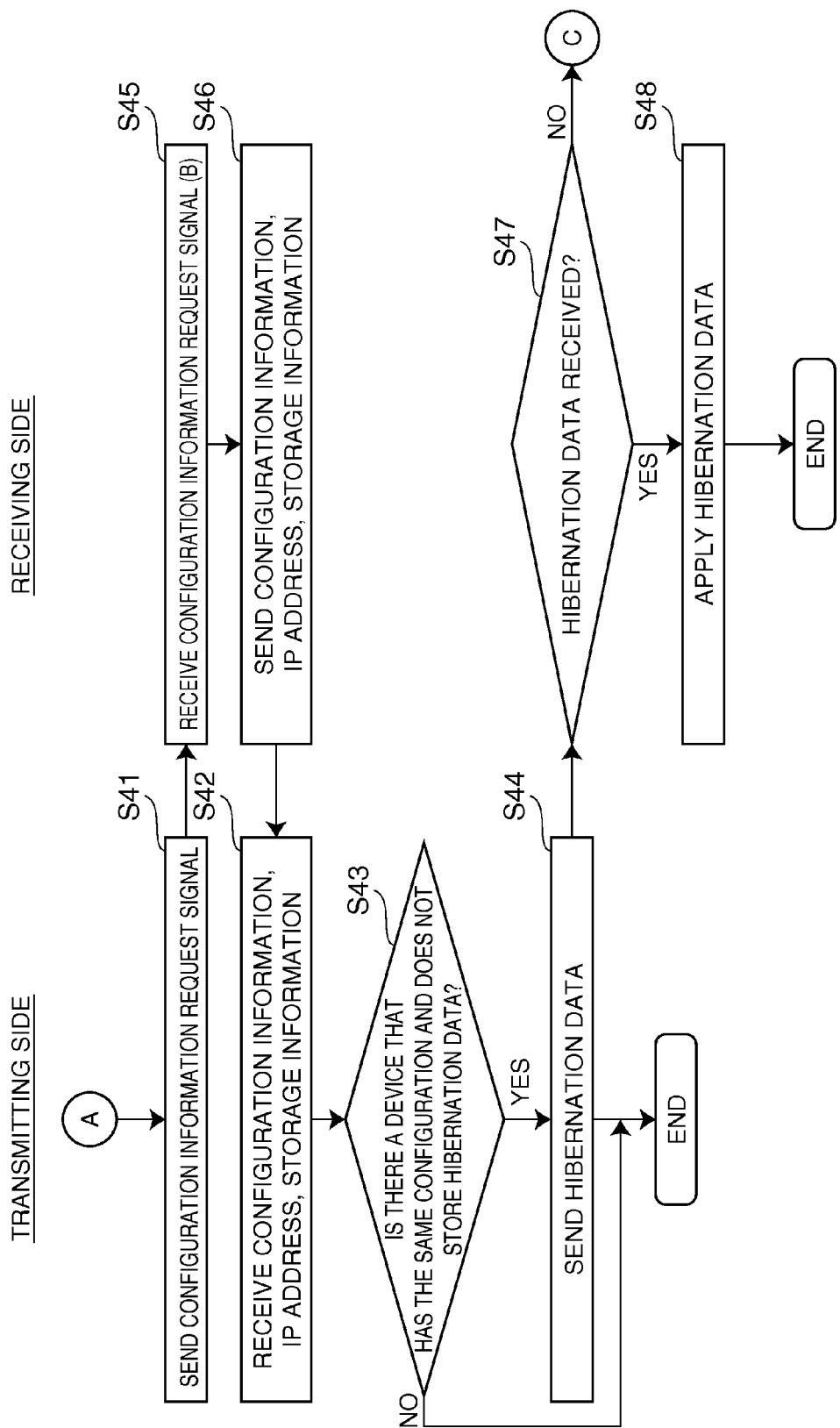
FIG. 11 is a flow chart of the data distribution process in the third embodiment of the invention.

If the optimal hibernation data is stored (S32 returns Yes), the device E sends a device configuration request signal to all other connected devices E as shown in FIG. 11 (S41). The configuration information, IP address, and hibernation data storage information is then received from the other device E (S42). The received information is then interpreted, and if there is among the other connected devices E a device E that has the same configuration and does not have the optimal hibernation data is determined (S43). If such a device E is found (S43 returns Yes), the hibernation data is sent to that device E (S44). The saved hibernation data is then restored and the device starts up.

However, if the optimal hibernation data is not stored (S32 returns No) and a configuration information request signal is received from another device E (S33 returns Yes (S45)), the device E sends the configuration information, IP address, and hibernation data storage information to the other device E (S46). If the device E receives hibernation data from another device E (S47 returns Yes), the receiving device E applies the hibernation data to itself (S48) and starts up. If hibernation data is not received from another device E (S47 returns No), the device E generates its own hibernation data (S40).

Although not shown in the figures, if the device E has the optimal hibernation data (S32 returns No) and a device configuration request signal is received from another device E, the device E sends the device configuration, IP address, and hibernation data storage information to the other device E.

If the device E that acquires the hibernation data is connected to a network other than network NT4, hibernation data can be distributed to the other devices connected to device E through that network using the data distribution method described in the first embodiment.

The third embodiment of the invention enables each device E to determine if hibernation data for itself is stored and receive hibernation data accordingly, and thereby automatically quickly distribute the hibernation data to devices E1, E2, . . . E6. Devices E1, E2, . . . E6 can therefore startup quickly.

The information processing device and hibernation data distribution method described above enable determining the device configuration of each device and the exchange of hibernation data only between devices with the same device configuration. Distributing unnecessary hibernation data to devices with a different device configuration can therefore be prevented. By thus appropriately distributing hibernation data during device startup, a plurality of devices connected over a network NT can be made to start up quickly without performing unnecessary transmission processes. Furthermore, because hibernation data does not need to be stored separately on each device, preprocessing to enable rapid startup is not necessary.

The configuration information in the embodiments described above is a hash value that is computed from text information describing the configuration of the hard disk drive, operating system, and applications installed on a device, but a hash value that is computed from text information describing hardware configuration information such as the version of the CPU installed in the device is also conceivable. Text information describing the configuration of applications and hardware installed in the device may also be used instead of a hash value. The invention is also not limited to the embodiments described above, and device configuration of the information processing devices (devices A, B, C, D, E) and the steps in the hibernation data distribution process, for example, can be varied in many ways without departing from the scope of the accompanying claims.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A data distribution system comprising:
a first information processing device including:
a first configuration information generating unit configured to generate first configuration information including information related to a type of an operation system and a version of an application installed on the first information processing device; and
a first configuration information storage unit configured to store the first configuration information;
a second information processing device communicatively coupled to the first information device, said second information processing device including:
a second configuration information generating unit configured to generate second configuration information including information related to a type of an operation system and a type of an application installed on the second information processing device;
a second configuration information storage unit configured to store the second configuration information;
a generating unit configured to generate a hibernation data storing an operating state of the second information processing device; and
a hibernation data storage unit configured to store the generated hibernation data;
a configuration information acquisition unit configured to acquire the first configuration information from the first information processing device;
a configuration evaluation unit configured to determine from the first configuration information and the second configuration information if the second configuration information is the same as the first configuration information; and
a data transmission unit configured to send the hibernation data to the first information processing device when the second configuration information is the same as the first configuration information.

2. The data distribution system described in claim 1, wherein the second information processing device includes a startup unit configured to use the hibernation data in the hibernation data storage unit to boot the second information processing device.

3. The data distribution system described in claim 1, wherein:
the first configuration information further includes information related to a version of the operation system and a version of the application installed on the first information processing device, and
the second configuration information further includes information related to a version of the operation system, and a version of the application installed to the second information processing device.

4. The data distribution system described in claim 1, wherein the operating state of the second information processing device is a state in which a login screen is displayed.

5. The data distribution system described in claim 1, wherein the operating state of the second information processing device is a state in which an application that is selected to be active at the start-up of the second information processing device has been started.

6. The data distribution system described in claim 1, wherein the first information processing device includes a data application unit configured to apply to the first information processing device the hibernation data received from the second information processing device.

7. The data distribution system described in claim 6, wherein:
the hibernation data generated in the second configuration information generating unit includes device-specific information of the second information processing device, and
the data transmission unit sends the hibernation data excluding the device-specific information.

8. The data distribution system described in claim 7, wherein:
the first information processing device stores a device-specific information of the first information processing device,
the data application unit embeds the device-specific information of the first information processing device into the hibernation data received from the second configuration information generating unit to create an embedded hibernation data, and
the data application unit applies the embedded hibernation data to the first information processing device.

9. The data distribution system described in claim 7, wherein the device-specific information of the second information processing device is at least one of a MAC address, IP address, and name of the second information processing device.

10. The data distribution system described in claim 6, wherein:
the hibernation data generated in the second configuration information generating unit includes a time information of the second information processing device; and
the data transmission unit send the hibernation data excluding the time information.

11. The data distribution system described in claim 10, wherein:
the first information processing device stores a time information of the first information processing device;
the data application unit embeds the time information of the first information processing device into the hibernation data received from the second configuration information generating unit to create an embedded hibernation data, and
the data application unit applies the embedded hibernation data to the first information processing device.

12. A data distribution system comprising:
a plurality of information processing devices communicatively coupled to each other;
a first information processing device among said plurality of information processing devices having first configuration data providing first hardware-and-software configuration information of the first information processing device and further including information on first hibernation data of the first information processing device, said first information processing device sending its first configuration data to at least a second information processing device among said plurality of information processing devices;

wherein:
- said second information processing device has second configuration data providing second hardware-and-software configuration information of the second information processing device including information on any second hibernation data of the second information processing device;
- said second information processing device responds to reception of the first configuration data by transmitting its second configuration data to the first information processing device;
- said first information processing device responds to reception of the second configuration data by comparing it to the first configuration data, and implementing the following steps:
  - (a) IF the first hardware-and-software configuration data matches the second hardware-and-software configuration data,
  - (b) THEN determining if the second information processing device has any second hibernation data, AND IF the second information processing data has no second hibernation data THEN the first information processing device transmits its first hibernation data to the second information processing device;
  - (c) ELSE the first information processing device does not send any hibernation data to the second information processing device;
- said second information processing device responds to reception of first hibernation data from the first information processing device by accepting the first hibernation data as its own second hibernation data and booting up using this accepted second hibernation.

13. The data distribution system of claim 12, wherein the sending of the first configuration data from the first information processing device to the second information processing device is part of a data broadcast from the first information processing device to all of said plurality of data processing devices.

14. The data distribution system of claim 12, wherein in step (b) if the IF the second information processing data has second hibernation data AND the second hibernation data is more optimal for the first hardware-and-software configuration than the first hibernation data THEN not sending any hibernation data to the second information processing device, ELSE transmitting the first hibernation data to the second information processing device.

15. The data distribution system of claim 14 wherein the second hibernation data is deemed to be more optimal than the first hibernation data if the second hibernation data is more recent than the first hibernation data.

16. The data distribution system of claim 12, wherein said second information processing device further responds to reception of first hibernation data from the first information processing device by transmitting its accepted second hibernation to a third processing device among said plurality of information processing devices whose hardware-and-software configuration matches the second hardware-and-software configuration and does not have its own hibernation data.

17. The data distribution system of claim 12, wherein said second information processing device further responds to reception of first hibernation data from the first information processing device by transmitting its accepted second hibernation to a third information processing device among said plurality of information processing devices whose hardware-and-software configuration matches the second hardware-and-software configuration and whose own hibernation data is less recent than the accepted second hibernation data.

18. The data distribution system of claim 17, wherein:
- said first and second information processing devices are on a first communication network;
- said second and third information processing device are on a second communication network;
- said third information processing device has no direct communication link to the first information processing device;
- said first information processing device is a network host for the first communication network; and
- said second information processing device is a network host for the second communication network.

19. The data distribution system of claim 17, wherein said first, second and third information processing devices are communicatively coupled to each other on a single communication network.

20. The data distribution system of claim 12, wherein the second information processing device responds to the first information processing device not sending any hibernation data to the second information processing device by internally generating its own second hibernation data anew.

* * * * *